United States Patent
Pareschi

(10) Patent No.: US 11,761,747 B2
(45) Date of Patent: Sep. 19, 2023

(54) METHOD AND APPARATUS FOR CHECKING DIMENSIONS OF A MECHANICAL PART

(71) Applicant: Marposs Societa' Per Azioni, Bentivoglio (IT)

(72) Inventor: Stefano Pareschi, San Pietro in Casale (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 448 days.

(21) Appl. No.: 17/056,954

(22) PCT Filed: May 22, 2019

(86) PCT No.: PCT/EP2019/063182
§ 371 (c)(1),
(2) Date: Nov. 19, 2020

(87) PCT Pub. No.: WO2019/224232
PCT Pub. Date: Nov. 28, 2019

(65) Prior Publication Data
US 2021/0180935 A1    Jun. 17, 2021

(30) Foreign Application Priority Data

May 23, 2018  (IT) ............................ 2018000005610

(51) Int. Cl.
*G01B 5/06*   (2006.01)
*G01B 5/00*   (2006.01)

(52) U.S. Cl.
CPC ............. *G01B 5/06* (2013.01); *G01B 5/0002* (2013.01)

(58) Field of Classification Search
CPC ........... G01B 5/06; G01B 5/0002; G01B 5/18
USPC ......................................................... 73/865.8
See application file for complete search history.

(56) References Cited

U.S. PATENT DOCUMENTS

| | | | |
|---|---|---|---|
| 5,088,206 A * | 2/1992 | Golinelli | ................ G01B 5/252 |
| | | | 33/550 |
| 5,714,686 A | 2/1998 | Penjaska | |
| 7,684,031 B2 | 3/2010 | Yokota et al. | |

(Continued)

FOREIGN PATENT DOCUMENTS

| | | |
|---|---|---|
| CN | 103424088 A | 12/2013 |
| CN | 105478367 A | 4/2016 |
| CN | 106885552 A | 6/2017 |

(Continued)

*Primary Examiner* — Marrit Eyassu
(74) *Attorney, Agent, or Firm* — Blank Rome LLP

(57) ABSTRACT

An apparatus for checking the length (H) of a chamfer (7) delimited by a first surface (5) and by an edge (S), comprises two feelers (15, 25)—movably connected to a same supporting frame (20)—and respective transducers (16,26). The transducers supply signals (T1, T2) indicative of displacements of the respective feelers along mutually perpendicular directions (Y, X). A checking method includes moving the supporting frame at a constant speed so that, during the movement, one of the feelers scans the chamfer and the other cooperates with the first surface. The signals of the respective transducers are acquired and transmitted synchronously to a processing unit (40) which processes them together with information on the mutual position of the two feelers to obtain the length of the chamfer.

17 Claims, 4 Drawing Sheets

(56) References Cited

U.S. PATENT DOCUMENTS

2011/0016978 A1\* 1/2011 Kleinert ............ G01N 29/4463
　　　　　　　　　　　　　　　　　　　　　　73/629
2015/0369581 A1　12/2015　Toso

FOREIGN PATENT DOCUMENTS

| DE | 40 15 576 A1 | | 11/1991 | |
|----|---|---|---|---|
| DE | 4015576 A1 | \* | 11/1991 | |
| DE | 19858214 A1 | \* | 7/2000 | ............ B23Q 17/20 |
| EP | 1 197 724 A1 | | 4/2002 | |
| EP | 3 123 107 A1 | | 2/2017 | |
| JP | 2006-226964 A | | 8/2006 | |
| JP | 2011-242201 A | | 12/2011 | |
| JP | 2016-504586 A | | 2/2016 | |
| TW | 200702657 A | | 1/2007 | |
| WO | WO 2015/144818 A1 | | 10/2015 | |
| WO | WO-2015189177 A1 | \* | 12/2015 | ............... G01B 3/46 |

\* cited by examiner

METHOD AND APPARATUS FOR CHECKING DIMENSIONS OF A MECHANICAL PART

TECHNICAL FIELD

The present invention relates to a method and an apparatus for checking the dimensions of a mechanical part, in particular for checking the distance of an edge from a surface. The invention is used in checking mechanical parts comprising chamfers, for example the tapered surface at the mouth of a cylindrical hole, for checking or measuring the length of these chamfers.

BACKGROUND ART

A number of solutions is known for the manual measurement of chamfers, where it is possible to get in contact with the surface of the chamfers by means of mechanical measuring devices allowing to calculate the length of the chamfer based on the value of angles of the chamfer known a priori.

An apparatus for checking the length of a chamfer is described for example in German patent application n. DE4015576A1. This apparatus comprises a support for the part to be checked and two stops, arranged side by side in known transversal positions, which engage along a longitudinal direction with an end surface of the part and with the surface of the chamfer, one of the stops being movable and connected to a sensor. Being known the value of the angle of the chamfer, the length of the chamfer is obtained from the sensor signal by means of suitable trigonometric calculations.

The apparatus according to the patent application DE4015576A1 is manually used, has not negligible dimensions and cannot be easily adapted for checking the length of inner chamfers, that is of tapered surfaces at the mouth of cylindrical holes.

Moreover, a task which cannot be performed by this apparatus or other known devices and instruments is that of checking the length of inner chamfers that are present in holes opening on inner surfaces of mechanical parts, surfaces that are not accessible from outside without compromising the integrity of the mechanical parts.

The sketch of FIG. 1 shows a mechanical part W with an outer surface 3, an inner surface, or first surface, 5, a hole 1, in particular a through hole that defines a second surface, for example a substantially cylindrical surface, 6 and a tapered connecting surface, or chamfer, 7 between said first and second surfaces. A substantially circular edge S separates—within the hole 1—the connecting surface 7 from the cylindrical surface 6. Because of the shape of the mechanical part, the inner surface 5 is not accessible and, to check the length H of the chamfer 7, that is the distance H, along the axis of the hole 1, of the edge S from the inner surface 5, the only possibility is to enter from the outer side, that is the side of the outer surface 3, through the hole 1.

Typical sizes of the length or chamfers as that shown in FIG. 1 range from a few tenths of millimeter to a few millimeters. The typical diameter of the hole has values ranging from a few millimeters to a few centimeters.

The difficulty of this type of measurement is in the limited room for accessing the chamfers on the inner side and in the need to carry out the check in a short period of time and in a completely automatic manner on a machine tool or other automatic machine.

There are not known solutions which allow to carry out measurements without acting on the mechanical part by cutting one or more portions which prevent access to the inner chamfer. This happens both when using contact measuring systems (plug gauges for checking internal dimensions, or tridimensional measuring machines), and when using machines equipped with optical scanning probes for non-contact checking.

Moreover, it is not known to carry out in a very short time (a few seconds) the measurement on the machine tool where the same mechanical part is worked.

Indirect measurements are possible and known by using tridimensional coordinate machines, but in this case special systems including a multiplicity of feelers are used for the acquisition of quotes in correspondence of a considerable quantity of points, in such a way to reconstruct the entire profile of the part, including the inner surface of the hole, the chamfer and the position of the inner surface of the part. These measurements require a complex processing and considerable times.

DESCRIPTION OF THE INVENTION

An object of the present invention is to provide an apparatus and a method for the dimensional checking of a mechanical part, that allow to check the distance between surfaces of this mechanical part, in particular the length of tapered portions or chamfers, and overcome the limitations of the known apparatuses, ensuring reliable results, sturdiness, compactness and flexibility of use also in a workshop environment. A further object of the invention is to obtain an apparatus that is able to carry out the dimensional and form deviation checking of chamfers that are present at the mouth of holes in correspondence of, that is opening on, inner surfaces of mechanical parts.

These and other objects are reached by a method and an apparatus according to the accompanying claims.

An apparatus according to the present invention comprises a support frame movable with respect to the mechanical part to be checked at least along a first direction and a first and a second feelers connected to the support frame so as to be spaced apart from each other along the first direction by a fixed space. The feelers can displace, with respect to the supporting frame, along directions perpendicular to each other, and a first and a second transducers synchronously provide a processing unit with signals related to the feeler displacements. A method according to the present invention for the use of this apparatus includes for the steps of arranging the support frame in a starting position, causing a mutual movement between the support frame and the mechanical part to be checked along the first direction and performing a calculation of the distance of the edge from the inner surface of the mechanical part in the first direction. During the above-mentioned mutual movement one of the feelers, movable along a direction perpendicular to the first one, carries out an at least partial scanning of the connecting surface and the corresponding transducer provides a relative scanning signal, while the other feeler which can move along the first direction, cooperates with the inner surface of the mechanical part and the corresponding transducer provides a relative reference signal, the scanning signal and the reference signal being mutually synchronized. The calculation of the distance of the edge from the inner surface takes place on the basis of the synchronized reference and scanning signals and the fixed space, and takes into account for example of a transition instant in which the feeler carrying out the scanning is in contact with the edge.

Objects and advantages of the present invention will become apparent from the following detailed description.

BRIEF DESCRIPTION OF THE DRAWINGS

The present invention will now be described with reference to the accompanying drawings, given by way of non-limiting examples, wherein.

BEST MODES FOR CARRYING OUT THE INVENTION

Figure 1:
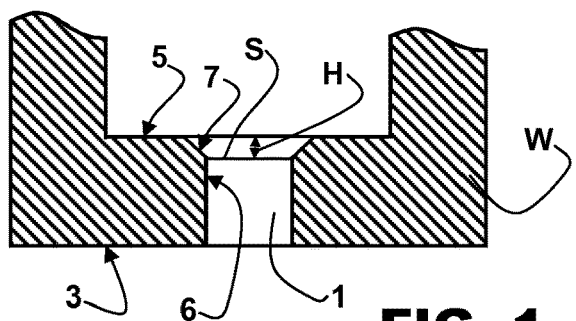
FIG. 1 is a partial schematic cross-sectional view of a mechanical part W to be checked.
Figure 2:
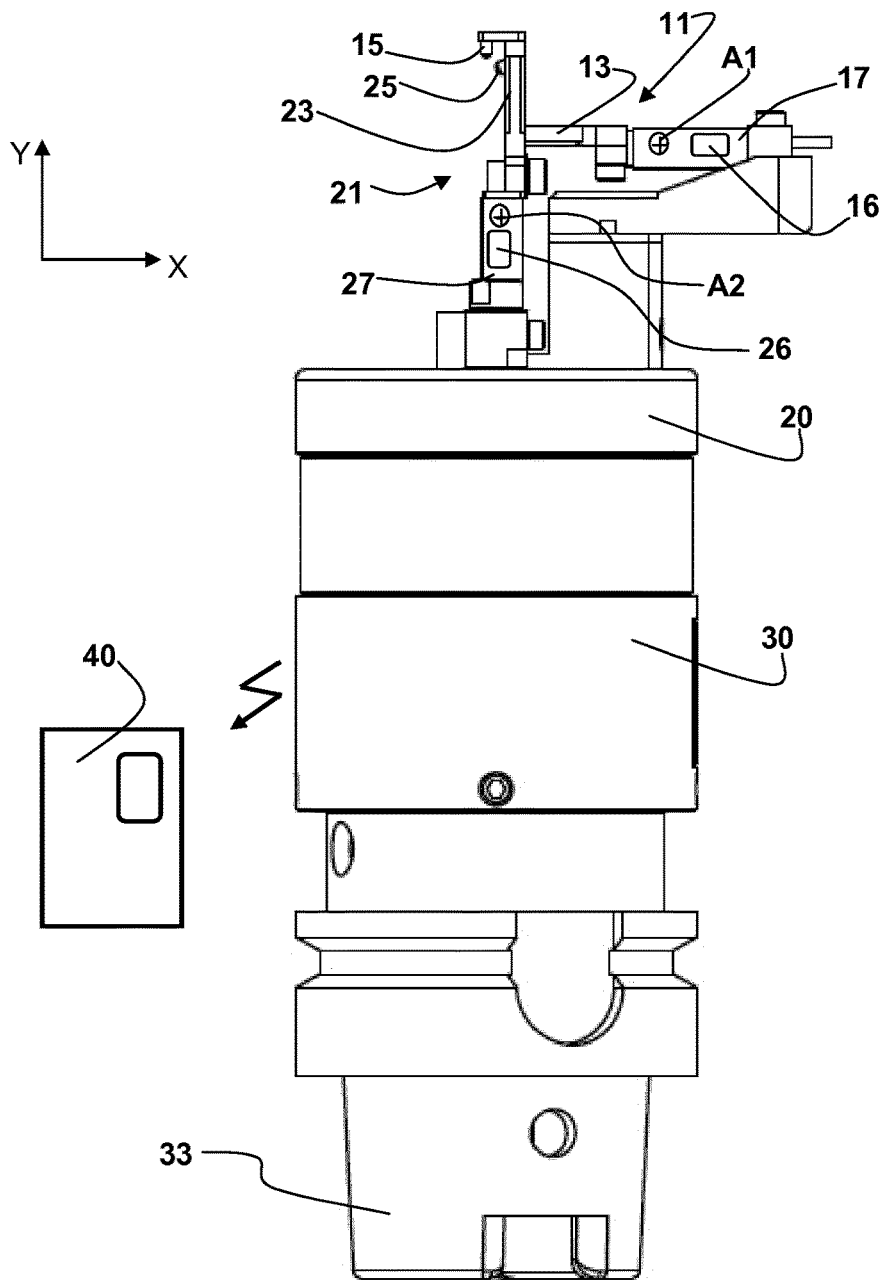
FIG. 2 is a side view of a checking apparatus according to the present invention.
Figure 3:
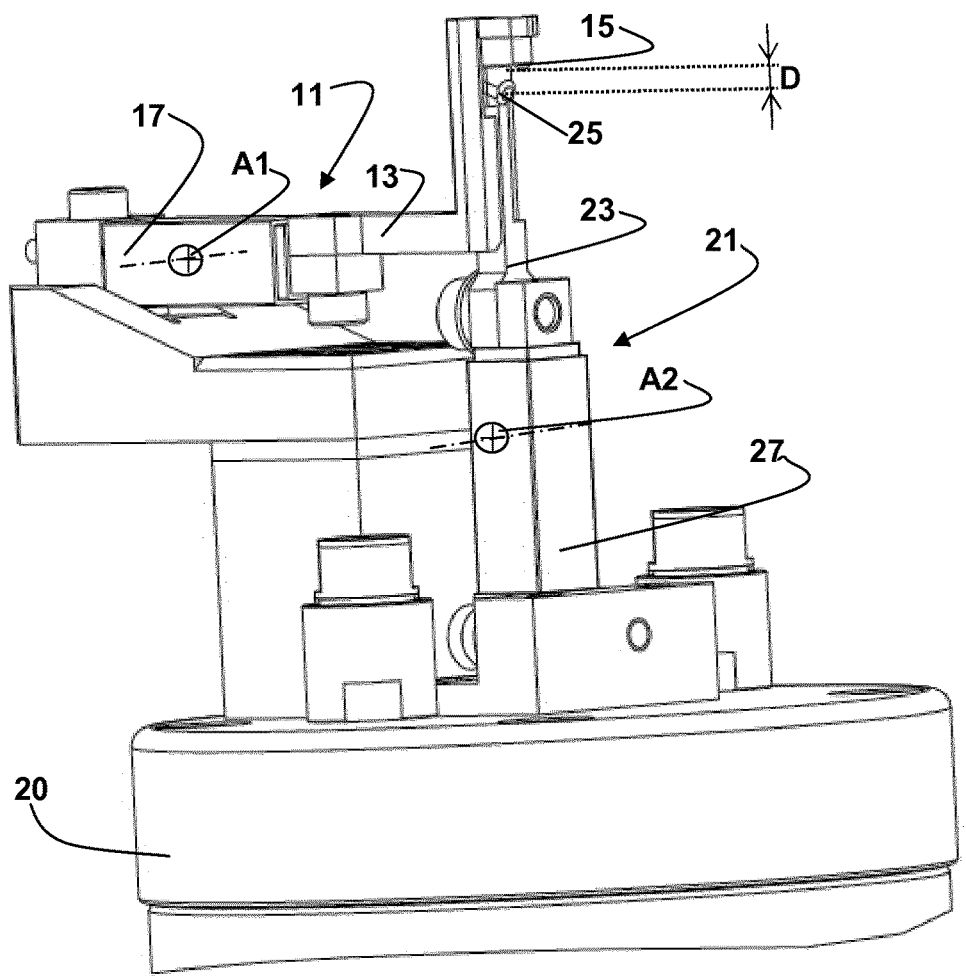
FIG. 3 is a partial and enlarged perspective view of the checking apparatus of FIG. 2.

FIGS. 2 and 3 show a checking apparatus or device according to the invention which comprises two gauging heads. A first gauging head 11 comprises a first arm 13 that is shaped and can pivot with respect to a steady part 17 thanks to fulcrum means (known per se and not shown in the figures) about a first axis A1 aligned along a direction perpendicular to the plane X-Y of FIG. 2. A first feeler 15 is connected to a free end of the first arm 13 and can perform limited movements substantially along a first direction Y. A second gauging head 21 comprises a second arm 23 that can pivot with respect to a steady part 27 thanks to fulcrum means (known per se and not shown in the figures) about a second axis A2 parallel to the first axis A1. A second feeler 25 is connected to a free end of the second arm 23 and can perform limited movements substantially along a second direction X. The heads 11 and 21, in particular the respective steady parts 17 and 27, are fixed to a supporting frame 20. The heads 11 and 21 comprise respective first and second transducers—of a known type, schematically shown in FIG. 2 and indicated by reference numbers 16 and 26 respectively—that provide an acquisition and transmission unit with electrical signals responsive to displacements of the feelers 15 and 25 with respect to the respective steady parts 17 and 27, that is with respect to the supporting frame 20. The acquisition and transmission unit, more specifically a radio transmitter, and the relative casing, which rigidly holds the supporting frame 20, are schematically represented in FIG. 2 and indicated by the reference numeral 30. The radio transmitter 30 comprises acquisition means capable of acquiring the signals of the two heads 11 and 21 in a synchronous way and transmitting the relative measurement values, while maintaining the synchronism, to a remote processing unit 40 schematically shown in FIG. 2 and indicated by the reference number 40. A cone 33 suitable to be installed in the spindle of a machine tool carries the radio transmitter 30.

The arrangement of the heads 11 and 21 and the connection to the supporting frame 20 is such that the first feeler 15 and the second feeler 25 are spaced from each other by a fixed space D along the first direction Y and that the transducers 16 and 26 indicate displacements of the respective feelers 15 and 25 in directions that are substantially perpendicular to each other. The fixed space D, defined for example by the distance between the center of the second feeler 25 and the point of contact along the first direction Y of the first feeler 15, is measured in a calibration phase, for instance by means of an optical measuring instrument.

According to the preferred embodiment shown in FIGS. 2 and 3, the checking apparatus is connected—by means of the cone 33—to the spindle of a machine tool and moves with the axes of the machine performing known movements at a known constant speed.

Figure 4A:
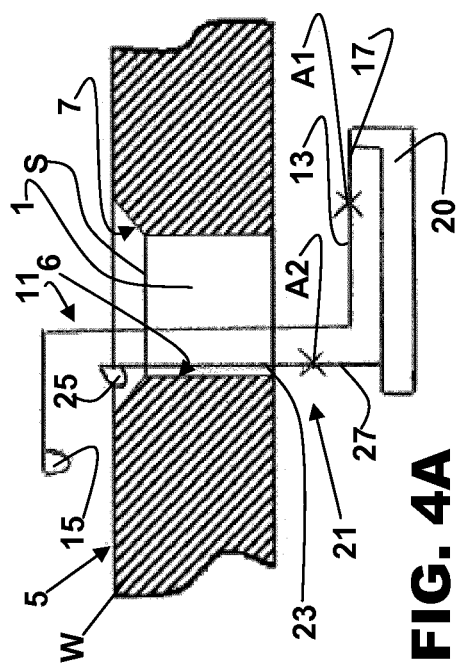
FIGS. 4A-4D show, in an extremely schematic way, different steps of a checking cycle performed by means of an apparatus according to the present invention.

To carry out the measurement of the length H of the chamfer 7, that is the distance along the first direction Y, of the edge S from the first surface, or inner surface, 5, the mechanical part W is suitably located in a per se known manner that is not shown in the figures. In a preliminary step a controlled movement in the first direction Y of the spindle, and a consequent movement of the supporting frame 20 which carries the checking device, is commanded to cause the arms 13 and 23 and hence the feelers 15 and 25 to pass through the hole 1, entering from the side of the outer surface 3 so as to be arranged in proximity of the inner surface 5 and of the connecting surface 7. The spindle and, as a consequence, the supporting frame 20 are then displaced with an initialization movement in the plane perpendicular to the first direction Y, along the second direction X to a starting position, that is a position from which a scan can be started. FIG. 4A schematically shows the starting position, in which the first feeler 15 faces the inner surface 5, while the second feeler 25 faces the chamfer 7.

Alternatively and according to a preferred embodiment of the invention, the starting position of the supporting frame 20 is defined by the contact between the second feeler 25 and the surface of the chamfer 7 in the aforesaid initialization movement along the second direction X.

Figure 5:
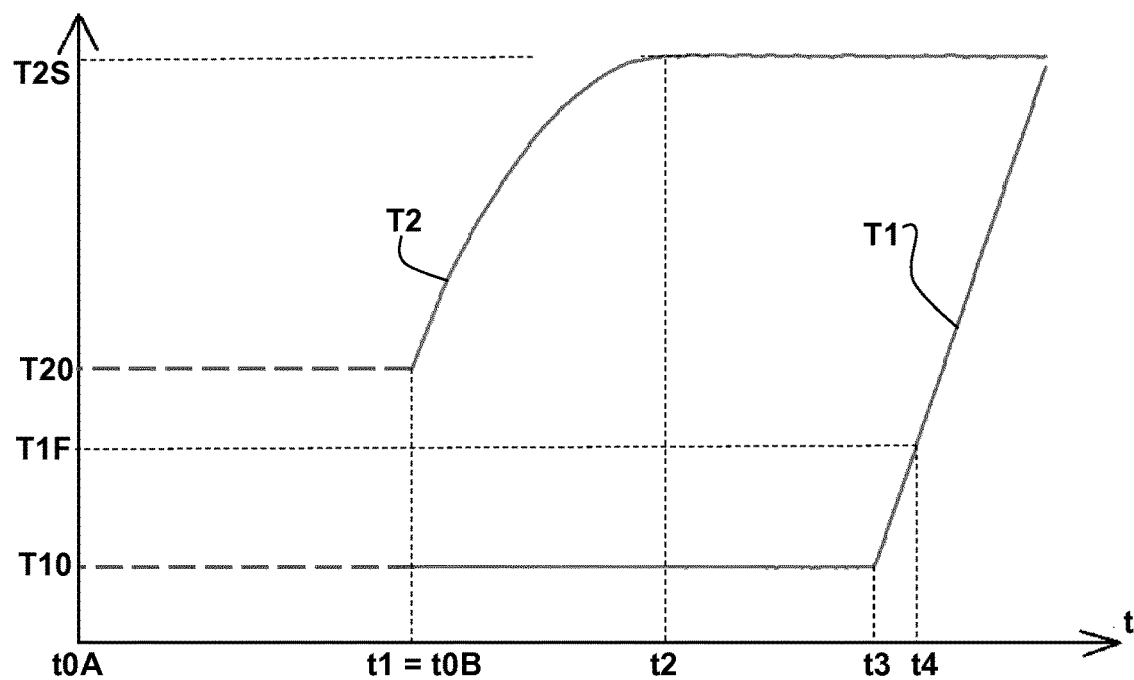
FIG. 5 is a graph that shows the trend of signals provided by transducers present in the checking apparatus according to the present Invention.

Starting from the starting position, a scanning movement along the first direction Y is controlled by the machine tool controls, so causing a mutual movement between the supporting frame 20 and the mechanical part W along the first direction Y. In the graph in FIG. 5, the upper curve T2 indicates the trend of a scanning signal provided by the second transducer 26, such signal being responsive to displacements of the second feeler 25 along the second direction X. In the same graph of FIG. 5, the lower curve T1 indicates the trend of a reference signal provided by the first transducer 16 which is responsive to displacements of the first feeler 15 along the first direction Y. In the course of the scanning movement the signals T1 and T2 are acquired in a synchronous way by acquisition means—of a known type and not shown in the figures—of the radio transmitter 30, and they are transmitted in a synchronous way to the remote processing unit 40. FIG. 5 shows the trend of both signals T1 and T2 which, as said above, relate to displacements of the feelers 15 and 25, respectively, in mutually perpendicular directions Y and X—to underline that these signals T1 and T2 are synchronized on the time scale.

If the starting position corresponds to that of FIG. 4A and the second feeler 25 is not in contact with the surface of the chamfer 7, a first step of the scanning along the first direction Y starts at an instant t0A. The second feeler 25, at an instant t1, comes into contact with the surface of the chamfer 7 (FIG. 4B) and follows its profile while the first feeler 15 moves toward the inner surface 5 of the mechanical part. The instant t1 can always be identified by evaluating the moment at which the signal of the transducer 26 starts changing.

Figure 4B:
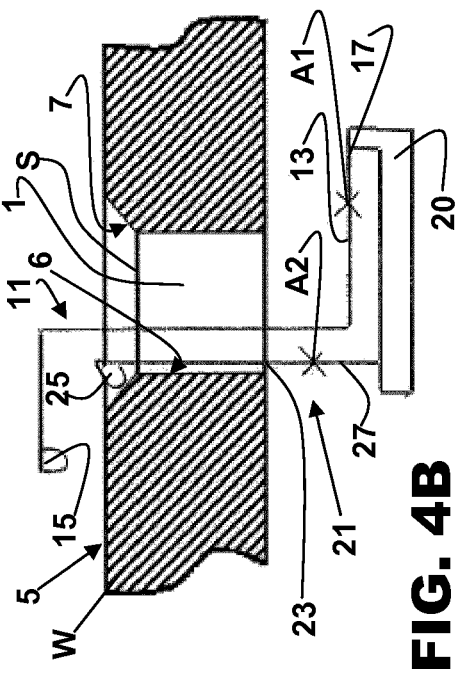

If, on the other hand, in the starting position the second feeler 25 is already in contact with the surface of the chamfer 7 in a configuration corresponding to that of FIG. 4B, the scanning along the first direction Y starts at an instant t0B corresponding for example to t1. The portions of the curves T1 and T2 that precede the instant t0B=t1 are indicated in FIG. 5 with broken lines since these portions are not present where the starting position is that shown in FIG. 4B. Also in this case the second feeler 25 follows the profile of the surface of the chamfer 7 while the first feeler 15 moves toward the inner surface 5 of the mechanical part.

Figure 4C:
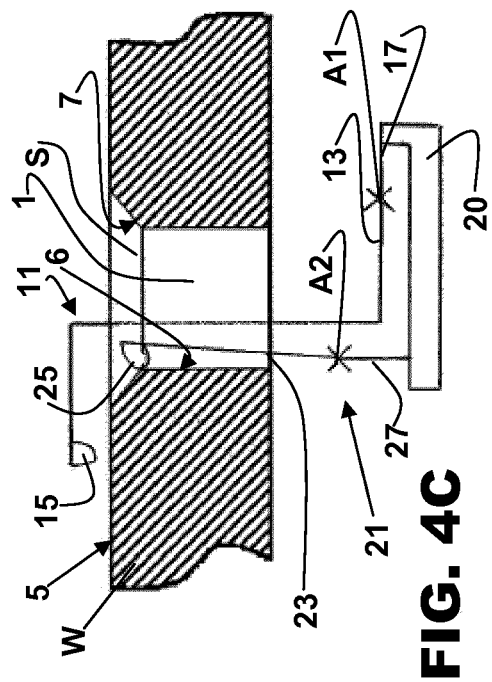
Figure 4D:
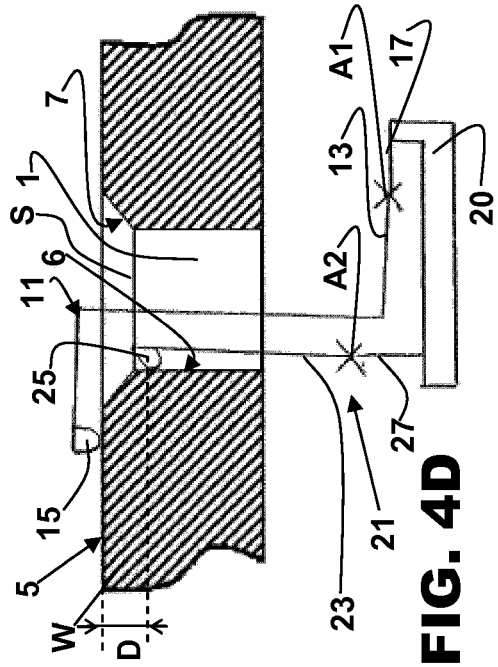

In the course of the scanning of the surface of the chamfer 7 the second feeler 25 moves in the second direction X and the second head 21 provides accordingly, through the acquisition means of the radio transmitter 30, a signal which, starting from an initial value T20, increases up to a value T2S at a transition instant t2 at which the second feeler 25 is in contact with the edge S which separates the chamfer 7 from the surface 6, for example cylindrical, of the hole 1 (FIG. 4C). The scanning motion in the first direction Y continues until the first feeler 15 at an instant t3 it comes into contact with the inner surface 5 of the mechanical part W and moves relative to the steady part 17 in the first direction Y (FIG. 4D). The first transducer 16 provides, through the acquisition means of the radio transmitter 30, the reference signal T1 responsive to the movement of the first feeler 15 (FIG. 5) which starts from an initial value T10. The movement of the supporting frame 20 is stopped in an end position at a stop instant t4 in correspondence of a predetermined value T1F of the reference signal T1, that is after a predetermined movement of the first feeler 15 (for example of 250 microns). It should be noted that the actual stop of the supporting frame 20 can occur at an instant subsequent to the instant t4.

In other words, a single movement in the first direction Y of the supporting frame 20 which carries the checking device is controlled by the machine tool controls, starting from the starting position to the end position. During the scanning, the second feeler 25 follows the profile of the chamfer 7, reaches and overruns the edge S until the first feeler 15 comes into contact with the inner surface 5 and provides the value of the increasing interference between feeler 15 and part W.

The length H of the chamfer 7, that is the distance H of the edge S from the first or inner surface 5 along the first direction Y, is determined by the processing unit 40 from an analysis of the curves, namely of the synchronized reference signal T1 and scanning signal T2 of FIG. 5 taking into account the scanning speed that is known and constant and determined by the machine tool, and the single additional information of calibration about the amount of the fixed space D, that is the value indicative of the distance in the first direction Y between feelers 15 and 25.

Figure 6:
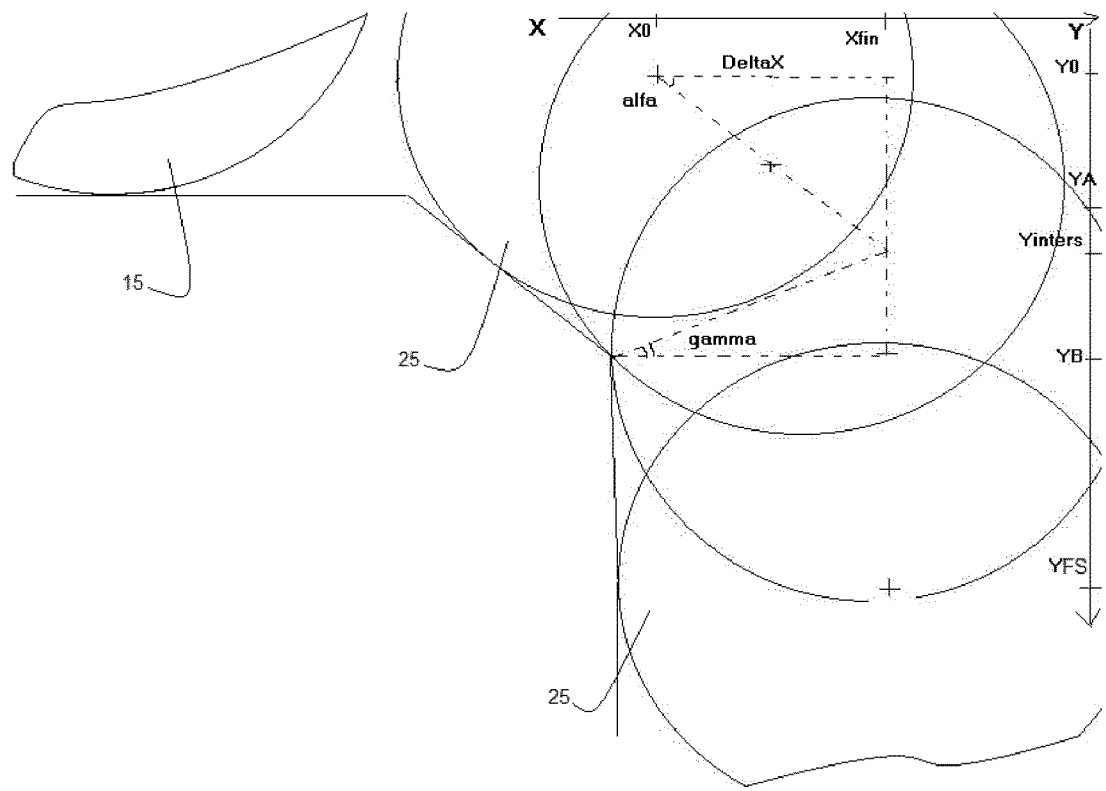
FIG. 6 graphically shows—in a schematic way—some of the positions taken by the feelers of the checking apparatus according to the invention during the scanning of the part to be checked, and FIG. 7 schematically shows some components of an apparatus according to an alternative embodiment of the present invention.

For example, the length H of the chamfer 7, can be determined by following the steps of one of the two methods that are described hereinbelow making reference to FIGS. 5 and 6.

In both cases it is considered that the starting position of the supporting frame 20 corresponds to that of FIG. 4B, that is in such a position at the instant t1=t0B the second feeler 25 is in contact with the connecting surface 7.

First Method

In summary: the transition instant t2 at which the signal T2 of the second transducer 26 assumes the value T2S, that is to say when the second feeler 25 is in contact with the edge S, is detected. The value of the length H of the chamfer 7 is obtained on the basis of the transition instant t2, of the stop instant t4 corresponding to the predetermined end position, and of the fixed space D, the latter being acquired as calibration data. In particular, in a calibration phase the fixed space D is acquired with appropriate instrumentation, for example an optical gauge, as the distance between the center of the second feeler 25 and the point of contact along the first direction Y of the first feeler 15 when the reference signal T1 of the first transducer 16 assumes the value T1F.

In more detail:

a reference system X-Y is identified having as origin O (X0, Y0) the center of the second feeler 25 and where the X and Y axes are aligned with the above-mentioned second direction X and first direction Y, respectively. The spindle of the machine tool carrying the supporting frame 20 moves in the first direction Y at a known, constant speed v. Thanks to the fact that the speed v is constant and known, the values of Y are obtained on the basis of the detected instants and time intervals. The instant of origin t0B is the one at which the second feeler 25 begins to move and to perform the scanning along the direction Y;

a value Xfin of the X coordinate of the center of the second feeler 25 at the end of the scanning of the chamfer 7, in correspondence of the edge S, is calculated. The value Xfin, corresponding to the value T2S of the scanning signal T2, is calculated by means of the zero derivative of the scanning signal T2;

the transition instant t2, at which the coordinate Xfin is reached, is detected;

a first value YB of the Y coordinate corresponding to Xfin is calculated. Such value YB is indicative of the position of the edge S along the first direction Y and is calculated as follows:

$$YB = v(t2 - t0B);$$

the stop instant t4 at which the first feeler 15 has moved by a predetermined amount, for example by 250 microns, and the reference signal T1 of the first transducer 16 assumes the value T1F, is detected;

a value YFS of the Y coordinate in the reference system of the machine tool at the stop instant t4 is calculated as follows:

$$YFS = v(t4 - t0B);$$

a second value YA of the Y coordinate indicative of the position of the first, inner surface 5 along the first direction Y is calculated by subtracting the fixed space D acquired as a calibration data from the value YFS;

the value of the length H of the chamfer 7 is calculated as follows:

$$H = YB - YA.$$

Second Method

In summary: this method makes use of the values of the angle formed by the chamfer 7 with the horizontal wall corresponding to the inner surface 5, and of the radius of the second feeler 25. The value of the length H of the chamfer 7 is obtained by using the signals of the second transducer 26 and of the first transducer 16 after contact has taken place between the first feeler 15 and the inner surface 5, and using the fixed space D obtainable in calibration for example as illustrated in relation to the first method.

While the radius of the second feeler 25 can be previously measured, the value of the angle between the connecting surface 7 and the inner surface 5 can be a known datum (for example indicated in the drawing of the part W) or can be calculated as the arc tangent of the ratio between the displacement along the Y axis (obtained by means of a translation of the spindle of the machine tool at a constant speed v) and the displacement along the X axis (given by the signal of the second transducer 26).

In more detail:

a reference system X-Y is identified and values Xfin, YFS and YA are calculated as explained above with reference to the first method;

a value alpha of the angle formed between the chamfer 7 and the horizontal wall corresponding to the inner surface 5 is calculated as the arc tangent of the ratio between the displacement along the Y axis (machine tool axis, obtained, as said with reference to the first method, on the basis of the known, constant speed v and the detected instants and time intervals) and the displacement along the X axis (signal of the second transducer 26). The displacements are for example detected by means of ten consecutive and synchronized acquisitions of values X and Y;

there are calculated:

the total displacement Delta X=(Xfin−X0) of the second feeler 25 along the X axis, a value Yinters=(tan (alpha)*Delta X) representing a first portion of displacement of the center of the feeler 25 along the first direction Y, an angle gamma=(π/2−alpha)/2, a distance G=(tan (gamma)*R)—where R is the radius of the second feeler 25 (for example 1 mm) which is a known constructive parameter—which represents a second portion of displacement of the center of the feeler 25 along the first direction Y, which corresponds to the zone where the point of contact of the second feeler 25 reaches the edge S, and a value YB=Yinters+G, corresponding to the position along the Y axis of the edge S;

the value of the length H of the chamfer 7 is given also in this case by:

$$H = YB - YA$$

The scanning speed v, defined by the controls, e.g. by actuating means, of the machine tool, can be selected in a wide range and must not necessarily be determined in advance, it is sufficient that it is not too high in relation to the acquisition frequency of the signals of the transducers 16 and 26. Typical values range from 10 to 100 mm/min. The higher scanning speed—for example about 100 mm/min—can for example be used with acquisition frequencies of a pair of synchronous values of the signals of the transducers 16 and 26 every 20 ms or higher. The possibility of performing scans at relatively high speed, allows to carry out checks in a particularly rapid time.

It is particularly advantageous—though not essential for the purposes of the present invention—that the checking apparatus be connected to the processing unit 40 by means of a wireless connection, in particular the already mentioned radio transmission system (30), to allow the automatic loading and the use in the spindle of the machine tool. The automatic loading from the store also enables to minimize centering errors, more specifically angular arrangement errors of the checking apparatus.

Different embodiments of the invention are possible, where the checking device is not connected to the spindle or to other movable parts of a machine tool, it is connected via cables to a processing unit and is used for offline checks.

In a different embodiment of the present invention the first gauging head 11 is a contact detecting probe, or "touch trigger" probe, that is a probe that can detect the contact with the inner surface 5 but does not include the transducer 16 and cannot provide a signal indicating the position or displacement along the first direction Y of the first feeler 15. In this case, in order to obtain the value of the length H of the chamfer 7, also signals provided by the machine tool are used, such signals being indicative of the position along the Y axis of the checking device (for example of the supporting frame 20) at the instant t3 when the contact takes place between the first feeler 15 and the inner surface 5, the contact being detected by the touch trigger probe.

The checking device according to the present invention allows to determine the length of an inner chamfer of a hole, that is to say a chamfer located on the side opposite to the direction of approach of the device, in a noninvasive manner, that is without any need to make any structural changes to the part to be checked.

The particularly compact structure of the checking apparatus allows a considerable flexibility of use, and the capability of accessing to internal chamfers in holes of small dimensions.

Figure 7:
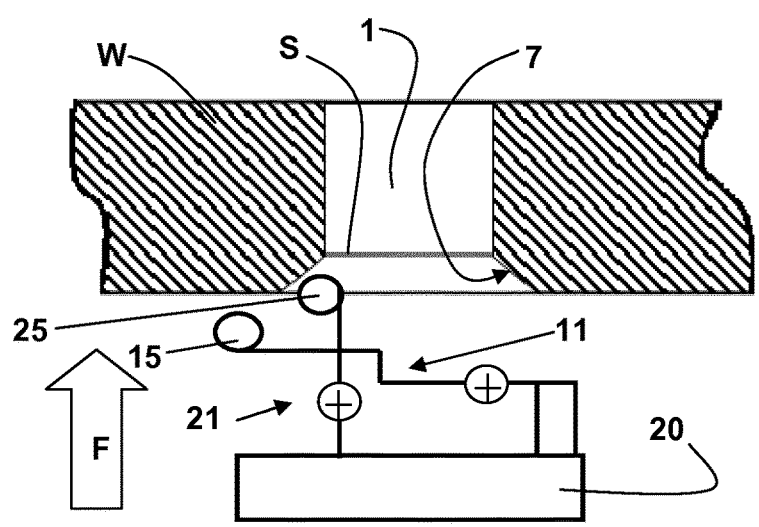

The use of a checking apparatus according to the invention is not limited to the check of inner chamfers. In fact, a device similar to the above-described apparatus and schematically represented in FIG. 7 can be used to check the length of external chamfers. In this case the supporting frame 20 which carries the heads 11 and 21 moves to scan in the direction indicated by the arrow F.

Alternative embodiments of the invention are possible, for example as regards the detection of the displacement values along the first direction Y in the course of scanning movements.

More specifically, the value of position in the first direction Y can be directly detected from the controls of the machine tool, and can be processed together with the scanning signal T2 of the second transducer 26 instead of being obtained as described above in the preferred embodiment on the basis of the constant speed and the detected instants of time.

According to an alternative embodiment, the first gauging head 11 features a wide measuring range, such as to cover the entire movement of the supporting frame 20 from the starting position to the end position. In this case the arrangement of the two heads 11 and 21 is such that in the starting position the first feeler 15 is in contact with the inner surface 5, or in any case that this contact takes place before the passage of the second feeler 25 in correspondence of the edge S. In this alternative embodiment, displacements of the checking device along the direction Y are detected by the gauging head 11 and there is not the need to get information from the machine tool control or, as described with reference to the preferred embodiment, to obtain this information on the basis of the detected time instants and the known, constant speed.

The invention claimed is:

1. A method for measuring or checking dimensions of a mechanical part which comprises a first surface and a hole, the hole defining a second surface, a connecting surface between said first and second surfaces and a substantially circular edge separating said connecting surface and said second surface, by means of a checking apparatus comprising
- a supporting frame movable with respect to the mechanical part at least along a first direction,
- a first feeler movably connected to the supporting frame at least along the first direction,
- a second feeler movably connected to the supporting frame at least along a second direction perpendicular to said first direction,
- the first and the second feelers being spaced apart from each other along said first direction by a fixed space,
- a first transducer coupled to the first feeler and providing signals responsive to displacements of the first feeler with respect to the supporting frame along said first direction, and
- a second transducer coupled to the second feeler and providing signals responsive to displacements of the second feeler with respect to the supporting frame along said second direction, the method comprising the following steps:
(i) arranging the supporting frame in a starting position,
(ii) causing a mutual movement between the supporting frame and the mechanical part along the first direction, during said mutual movement:
a. the second feeler performs an at least partial scan of the connecting surface and the second transducer provides a relative scanning signal, and
b. the first feeler cooperates with the first surface and the first transducer provides a relative reference signal, said scanning signal and said reference signal being mutually synchronized, and
(iii) performing a calculation of a distance of said edge from the first surface along the first direction based on said mutually synchronized reference and scanning signals and on said fixed space.

2. The method according to claim 1, wherein said calculation of a distance comprises:
the calculation of a first value indicative of a position of the edge along the first direction,
the calculation of a second value indicative of a position of the first surface along the first direction, and
the calculation of a difference between said first value and said second value.

3. The method according to claim 2, comprising the step of detecting, according to the scanning signal, a transition instant in which the second feeler is in contact with the edge, said calculation of a distance taking into account the transition instant.

4. The method according to claim 3, wherein said first value is calculated on the basis of said transition instant.

5. The method according to claim 4, comprising the step of detecting a stop instant in which the first feeler is in contact with the first surface and the reference signal assumes a prefixed value, said calculation of a distance taking into account the stop instant.

6. The method according to claim 5, in which said second value is calculated on the basis of said stop instant and said fixed space.

7. The method according to claim 6, in which the mutual movement between the supporting frame and the mechanical part along the first direction takes place at a known and constant velocity.

8. The method according to claim 4, in which the mutual movement between the supporting frame and the mechanical part along the first direction takes place at a known and constant velocity.

9. The method according to claim 2, comprising the step of detecting a stop instant in which the first feeler is in contact with the first surface and the reference signal assumes a prefixed value, said calculation of a distance taking into account the stop instant.

10. The method according to claim 9, in which said second value is calculated on the basis of said stop instant and said fixed space.

11. The method according to claim 10, in which the mutual movement between the supporting frame and the mechanical part along the first direction takes place at a known and constant velocity.

12. The method according to claim 1, in which the mutual movement between the supporting frame and the mechanical part along the first direction takes place at a known and constant velocity.

13. The method according to claim 1, wherein in the starting position the first feeler faces the first surface and is spaced apart from it, and, during the mutual movement between the supporting frame and the mechanical part along the first direction, the first feeler moves towards the first surface and the first transducer provides said reference signal upon contact between the first feeler and the first surface.

14. The method according to claim 1, wherein said first surface is an inner surface of the mechanical part and the hole is a through hole, the method comprising a preliminary step in which said supporting frame is moved to cause said first and second feelers to pass through the hole to be arranged in proximity of said first surface and connecting surface.

15. An apparatus for measuring or checking dimensions of a mechanical part which comprises a first surface and a hole, in particular for checking a length of a tapered connecting surface of the hole, the apparatus comprising
- a supporting frame movable with respect to the mechanical part at least along a first direction,
- a first feeler movably connected to the supporting frame at least along said first direction,
- a second feeler movably connected to the supporting frame at least along a second direction perpendicular to said first direction,
- the first and the second feelers being spaced apart from each other along said first direction by a fixed space,
- a first transducer coupled to the first feeler and providing signals responsive to displacements of the first feeler with respect to the supporting frame along said first direction,
- a second transducer coupled to the second feeler and providing signals responsive to displacements of the second feeler with respect to the supporting frame along said second direction, and
- a processing unit configured to synchronously receive the signals provided by the first and the second transducers and to calculate the length of the tapered connecting surface based on said synchronously received signals and on said fixed space.

16. The apparatus according to claim 15, comprising an acquisition and transmission unit connected to the supporting frame for synchronously acquiring the signals provided by said first and second transducers and synchronously transmitting said signals to the processing unit.

17. The apparatus according to claim 16, wherein said acquisition and transmission unit comprises a radio transmitter.

* * * * *